Feb. 9, 1932.     C. M. TERRY     1,844,023

HOSE CLAMP

Filed Jan. 2, 1929

WITNESS
A. G. Blodgett

INVENTOR
CHARLES M. TERRY
BY
Clayton L. Jenks
ATTORNEY

Patented Feb. 9, 1932

1,844,023

UNITED STATES PATENT OFFICE

CHARLES M. TERRY, OF DECATUR, ILLINOIS, ASSIGNOR TO A. W. CASH COMPANY, OF DECATUR, ILLINOIS, A CORPORATION OF DELAWARE

HOSE CLAMP

Application filed January 2, 1929. Serial No. 329,796.

This invention relates to hose clamps, and more particularly to a device of this type which will serve to hold a flexible hose firmly in position on its connecting member against a high fluid pressure.

Considerable difficulty is experienced with hose clamps as heretofore constructed, in that they frequently permit leakage of fluid under high pressure, and the hose is sometimes even blown entirely away from its connection. Moreover, these prior devices are often difficult to apply, and it is sometimes necessary to use a vise or other special tool for this purpose. In addition, the life of a hose when used with the ordinary clamp is usually very short, particularly when it is being moved about a great deal, since the tendency is for the hose to bend sharply at a point close to the clamp, and this sharp bending places an excessive strain on the material forming the hose.

It is accordingly one object of my invention to overcome such difficulties and to provide a hose clamp which will be effective to maintain a connection and prevent leakage even under extremely high pressures.

Further objects of my invention are to provide a hose clamp which may be easily applied without special tools, which will prolong the life of the hose by preventing it from bending too sharply adjacent to the clamp, and which will be simple and inexpensive to manufacture.

With these and other objects in view, as will be apparent to those skilled in the art, my invention resides in the combination of parts set forth in the specification and covered by the claims appended hereto.

Referring to the drawings illustrating one embodiment of my invention, and in which like reference numerals indicate like parts:

Figure 1:
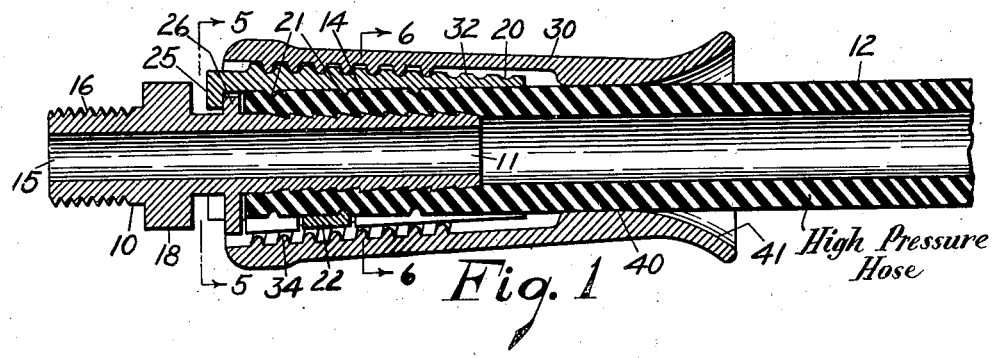
Fig. 1 is a longitudinal section through the center of the device, the section being taken on the line 1—1 of Fig. 6.

In accordance with my invention, I provide a hose clamp arranged to secure a flexible hose on the end of a pipe inserted therein. This clamp comprises a plurality of identical blocks tapering in thickness longitudinally and shaped to fit against the outer periphery of the hose. These blocks are provided with screw threads on their outer surfaces. A hollow cylindrical sleeve is utilized to force the blocks against the hose, and this is preferably formed with multiple internal screw threads which correspond in number to the number of blocks. The blocks may have integral hook portions which contact with a shoulder on the pipe, and this shoulder may have projections which space the blocks properly at assembly.

The embodiment of the invention illustrated in the drawings comprises a connecting member 10 provided with a cylindrical projecting pipe or spud 11 to which a flexible hose 12 is attached. The hose may be of rubber and fabric or of any other construction which will provide flexibility and sufficient strength to withstand the pressure of the fluid to be transmitted. The projection 11 is preferably provided with circumferential grooves 14 which form sharp edges and aid in keeping the hose in position. The outside diameter of the spud is somewhat greater than the normal internal diameter of the hose, so that the hose is stretched slightly in forcing it thereon. The member 10 is formed with a central opening 15 to permit flow therethrough.

It will be understood that the member 10 may be used at either the inlet or the outlet end of the hose, and ordinarily will be used at both ends, and that it may be constructed in various ways to effect a desired connection. In the embodiment illustrated I have shown this member as provided with external screw threads 16 at the end opposite the spud 11, in order that it may be screwed into a correspondingly tapped opening in a pump, nozzle, or other device. A hexagonal portion 18 is located adjacent to the threads 16 for convenience in applying a wrench at assembly.

Figure 4:
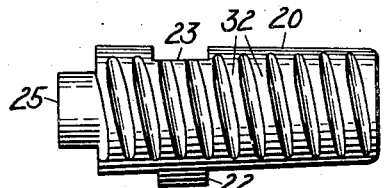
Fig. 4 is a detail view of one of the clamping blocks.

In order to prevent leakage and hold the hose 12 firmly in position under high fluid pressure, it is necessary to make use of a suitable clamping device. For this purpose I provide clamping blocks 20, preferably three in number as illustrated, which are equally spaced about the outer periphery of the hose. Each block 20 is substantially rectangular in shape, as illustrated in Fig. 4, and its inner surface is curved to fit the outside of the hose as shown particularly in Fig. 6. Transverse ribs 21 (Fig. 1) may be provided on this inner surface for the purpose of adding strength and improving the frictional grip on the hose. Each block 20 is preferably provided with a lateral projection 22 on one side and a corresponding recess or notch 23 on the other side. At assembly, each projection fits into the notch on the adjacent block and thus tends to prevent bulging of the hose between the blocks. Each of the blocks 20 is provided at one end with a narrow inwardly extending hook shaped portion 25 arranged to hook over a peripheral flange or shoulder 26 on the member 10 and thus hold the block in position. The flange 26 is preferably provided with three spaced, radially extending projections 27, which are of assistance in properly locating the blocks at assembly.

Figures 5, 6, 7:
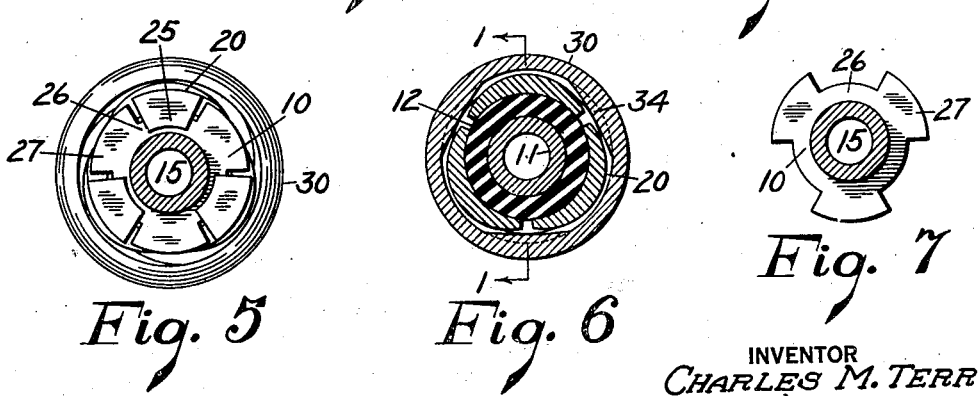
Fig. 5 is a cross section on the line 5—5 of Fig. 1.
Fig. 6 is a cross section on the line 6—6 of Fig. 1.
Fig. 7 is a cross section on the line 7—7 of Fig. 3.

For the purpose of forcing the blocks 20 firmly against the hose, I provide an outer clamping member shown as a hollow substantially cylindrical sleeve 30 which is arranged co-axial with the hose and surrounding the blocks. Each block is preferably tapered longitudinally with the thick portion adjacent to the hook 25, as shown particularly in Fig. 1, and the sleeve 30 may exert pressure on the blocks because of the wedging action caused by forcing the sleeve over the tapered blocks. In order to facilitate assembly and hold the sleeve in place I preferably provide screw threads 32 on the outer surface of the blocks 20, and cooperating screw threads 34 on the inner surface of the sleeve 30. As shown in Fig. 1, the threads 34 are tapered to correspond with the taper of the threads 32. It will be understood that the screw threads serve as cams, and so are the full equivalent of various cam arrangements that may be used. I prefer to utilize as many threads on the inside of the sleeve as there are clamping blocks, since this construction permits all the clamping blocks to be made exactly alike, thus reducing the cost of manufacture and rendering it unnecessary to arrange the blocks in any particular order at assembly. For example, in the embodiment illustrated there are three of the blocks 20, and I have therefore shown a triple thread on the inside of the sleeve, as indicated in Fig. 6. The use of a multiple thread has a further advantage in that it makes possible a more rapid assembly of the device, only a few turns of the sleeve being required.

Figure 2:
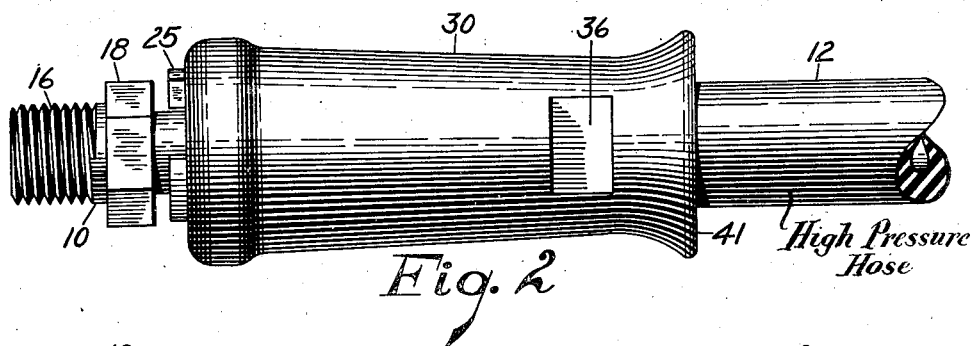
Fig. 2 is a side elevation showing the external appearance of the device.
Figure 3:
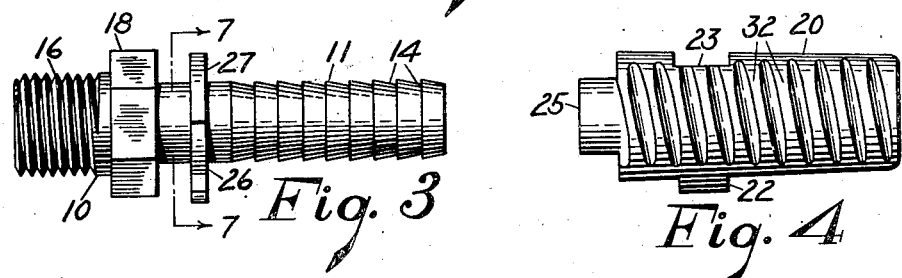
Fig. 3 is a detail view of the member to which the hose is attached.

As shown in Fig. 6, the blocks 20 may be made somewhat thicker at the center than at the edges, in order that the sleeve may contact with the blocks at their central portions only. By applying force in this manner at three equally spaced points around the periphery, a substantially even pressure is transmitted to the hose, and leakage is effectually prevented. Although in most cases the sleeve can be tightened sufficiently by hand, I preferably provide diametrically opposite flat spots 36 (Fig. 2) on the outer surface of the sleeve, in order that a wrench may be applied thereto if desired.

A further feature of the invention involves a construction which is arranged to prevent damage to the hose caused by too sharp a bending thereof adjacent to the clamp. For this purpose I reduce the inside diameter of the sleeve at the point 40 in the rear of the blocks 20 so that it fits the outside of the hose rather closely, and in the rear of this reduced section I provide a flaring or bell shaped portion 41, the inner surface of which is formed with a comparatively long radius of curvature. It will now be seen that, as the hose is swung about relative to the hose clamp, it will bend over the inner curved surface of the bell 41, and because of the long radius no damage will be done to the hose from such bending.

In assembling the device the sleeve 30 is first slipped over the hose, and the hose is then forced over the spud 11. The blocks 20 are next placed in position around the hose without regard to any particular order of arrangement, and the sleeve is screwed tightly over them. The projections 27 space the blocks properly and prevent them from turning. Because of the tapered construction of the clamping blocks a tremendous pressure can be exerted on the hose with a comparatively slight effort applied to the sleeve. The complete assembly can be made by hand without the necessity of using tools.

The device is simple and inexpensive to manufacture. The only machine work necessary in the embodiment illustrated is involved in producing the screw threads 16, and these threads may be eliminated by forming the spud 11 integral with the device to which the hose is to be connected.

Having thus described my invention, what I claim as new and desire to secure by Letters Patent is:—

1. A hose clamp comprising a member having a hollow cylindrical projection arranged to enter the opening in the hose, a plurality of blocks arranged to be placed around the outer periphery of the hose, each block tapering in thickness longitudinally and having screw threads on its outer surface, the blocks having their threads identically arranged and being interchangeable, and a hollow cylindrical sleeve provided with multiple internal screw threads corresponding in number to the number of blocks, said sleeve being arranged to screw over the outside of the blocks and force them against the hose, thereby clamping the same against said projection.

2. A hose clamp comprising a member having a hollow cylindrical projection arranged to enter the opening in the hose, three blocks arranged to be placed around the outer periphery of the hose, each block tapering in thickness longitudinally and having screw threads on its outer surface, the blocks having their threads identically arranged and being interchangeable, and a hollow cylindrical sleeve provided with triple internal screw threads, said sleeve being arranged to screw over the outside of the blocks and force them against the hose, thereby clamping the same against said projection.

3. A connecting device for a hose comprising a member having a hollow cylindrical projection arranged to enter the opening in the hose and having a shoulder thereon, a plurality of blocks arranged to be placed around the outer periphery of the hose, each block tapering in thickness longitudinally and having screw threads on its outer surface, the blocks having narrow spaced hooks which contact with said shoulder at assembly, a hollow cylindrical sleeve provided with internal screw threads arranged to screw over the outside of the blocks and force them against the hose, and a plurality of spaced radially extending projections on said member which are located between the hooks and serve to space the blocks properly at assembly and prevent them from turning when the sleeve is screwed over the blocks.

Signed at Decatur, Illinois, this 29th day of December, 1928.

CHARLES M. TERRY.